3,365,438
POLYMER AND DILUENT RECOVERY PROCESS
Charles Alvin Wentz, Jr., Bartlesville, Okla., assignor to Phillips Petroleum Company, a corporation of Delaware
Filed Feb. 24, 1964, Ser. No. 346,688
1 Claim. (Cl. 260—94.9)

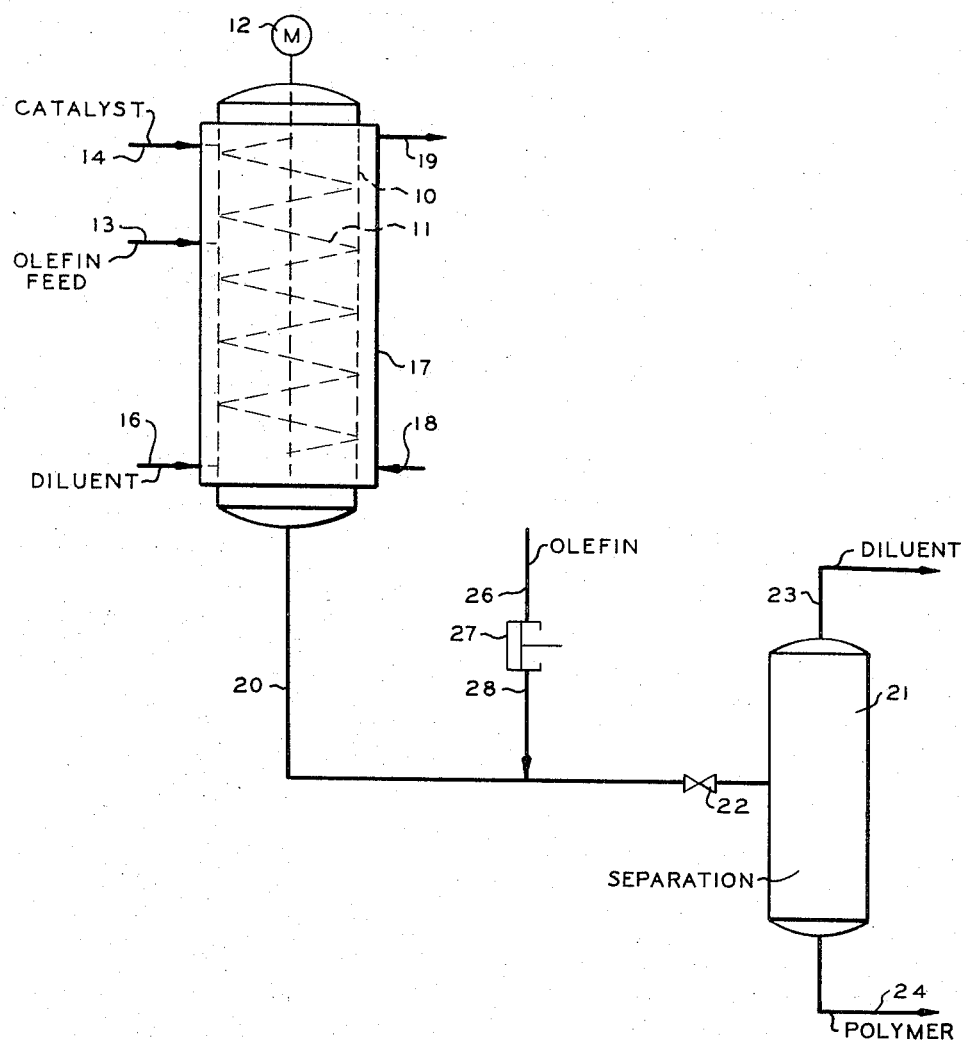

This invention relates to a process for the separation of polymer and diluent withdrawn from a solution polymerization reaction zone. In another aspect, this invention relates to an improved process wherein the diluent withdrawn with the polymer from a solution polymerization reaction zone is separated from the said polymer by vaporization.

In conventional polymerization processes wherein polymers are produced in the presence of a solvent, it is required that the recovery of the solid product polymer in a process step subsequent to the polymerization process be provided for separation of the product polymer and diluent. A conventional separation method comprises subjecting the effluent comprising polymer and diluent to a flash vaporization step, thereby vaporizing the diluent and separating the diluent from the solid product polymer. The recovery of the polymer by flashing the diluent is an advantageous method of recovery as it can be accomplished in relatively simple equipment. This method of separating product polymer and diluent becomes increasingly inefficient as the concentration of product polymer in the effluent withdrawn from the polymerization reaction zone increases. The effluent becomes viscous and the removal of the diluent from the polymer by a flash-vaporization step is extremely difficult.

An object of my invention is to provide an improved process for the separation of a product polymer from the diluent contained in the effluent withdrawn from a solution polymerization reaction zone.

Another object of my invention is to provide an improved process wherein the product polymer contained in the effluent from a solution polymerization zone is separated from the diluent by a vaporization step.

Other objects, advantages and features of my invention will be readily apparent to those skilled in the art from the following description, drawing and appended claim.

I have discovered an improved separation process wherein the effluent recovered from the polymerization zone is contacted with a monomer or monomers utilized in the polymerization process and the admixture passed to a subsequent polymer and diluent recovery process wherein the diluent is separated from the polymer by vaporization.

The invention is applicable to solution polymerization processes broadly and is particularly applicable to solution polymerization processes wherein the concentration of polymer product in the polymerization zone is relatively high. The invention is applicable to solution polymerization processes wherein the monomeric material polymerized in the presence of a diluent comprises conjugated dienes containing from 4 to 8, inclusive, carbon atoms per molecule. The invention is applicable to the polymerization of the above-defined conjugated dienes, either alone or in admixture with each other and/or with, in minor amounts, one or more other compounds containing an active $CH_2=C<$ group which are copolymerizable therewith.

The invention is also applicable to solution polymerization processes wherein homopolymers or copolymers of 1-olefins are produced. In accordance with a typical process, ethylene or mixtures of ethylene with other unsaturated 1-olefin polymers are contacted with a suspension of a chromium oxide-containing and/or an organometal catalyst in a liquid hydrocarbon diluent. The invention is applicable to the polymerization of aliphatic 1-olefins having from 2 to 8 carbon atoms per molecule and no chain branching nearer the double bond than the 4-position. These olefins include ethylene, propylene, 1-butene, 1-pentene, 1-hexene, 1-heptene, 1-octene, 4-methyl-1-pentene, butadiene, and isoprene. The liquid hydrocarbons employed in solution polymerization processes are those which are liquid and chemically inert under the reaction conditions. Liquid hydrocarbons which can be used in the polymerization of 1-olefins, are liquid and chemically inert under the reaction conditions, include paraffins, such as those having from 3 to 12, preferably from 3 to 8, carbon atoms per molecule. Examples of paraffins which can be used include propane, n-butane, n-pentane, isopentane, n-hexane, n-decane, 2,2,4-trimethylpentane, and the like. Another class of hydrocarbons which can be employed as diluents are naphthenic hydrocarbons having from 4 to 6 carbon atoms in a naphthenic ring and which can be maintained in the liquid phase in the polymerization conditions.

The drawing is a schematic representation of one embodiment of the invention.

Although not to be limited thereto, the invention will hereinafter be described as it is applied to the solution polymerization of 1-olefins wherein the concentration of the product polymer in the polymerization zone is relatively high (preferably at least 20 weight percent). This high concentration of polymer is desirable as the amount of diluent recycled is decreased, thereby reducing operating costs.

Referring to the drawing, a high-solids reactor 10 is provided with scraper and/or auger means 11 operated by motor 12. A suitable reactor is disclosed by W. C. Lanning in U.S. Patent No. 2,894,824. A 1-olefin feed is introduced to the reactor via conduit means 13.

In order to maintain a relatively high concentration of solid polymer in the reactor, a high ratio of olefin to solvent and to catalyst in the feed to the reaction zone is maintained so that the concentration of polymer in the resulting solution is at least 20 weight percent and the concentration of catalyst therein so low that the concentration of catalyst in the polymer product, without removal of catalyst, is not more than about 0.02 weight percent. For example, assuming that ethylene comprises the 1-olefin feed passed to reactor 10, ethylene can be introduced into reactor 10 at the rate of about 73,212 pounds per day at a temperature of about 230° F.

A suspension of finely divided catalyst in solvent is introduced into reactor 10 via conduit means 14. The catalyst employed in the invention can comprise a highly active powdered catalyst having a maximum particle size of 100 microns, 50 percent thereof being below 10 microns in size, and consisting essentially of chromium oxide deposited on silica-alumina, at least a portion of the chromium being hexavalent in form at the initial contacting of the olefin. The alumina may be partially or totally substituted for zirconia and/or thoria. The chromium oxide in the catalyst can be in the range of 0.1 to 10 weight percent and is ordinarily about 1.5 to 3 weight percent of the composite catalyst. With ethylene as the 1-olefin feed to reactor 10, the catalyst can consist essentially of chromium oxide (a portion hexavalent) deposited on silica-alumina (chromium oxide concentration of about 2 weight percent) in finely divided form, 50 weight percent being less than 10 microns in size, admixed with cyclohexane (as a solvent feed) and the resulting catalyst slurry passed to reactor 10 at the rate of 14.4 pounds of catalyst per day.

A hydrocarbon diluent is passed via conduit means 16 to reactor 10. When polymerizing ethylene, and with the ethylene feed to the reactor 10 as previously described, the total feed of cyclohexane diluent to reactor 10 can comprise 108,000 pounds per day.

As the reaction within reactor 10 is exothermic, a cooling medium is passed to a jacket 17 surrounding reactor 10 via conduit means 18 and withdrawn from the jacket 17 via conduit means 19. In the polymerization of ethylene in the presence of cyclohexane, the temperature within reactor 10 can be maintained at about 300° F. by means of circulating water or cyclohexane through jacket 17. When operating according to these specific conditions hereinbefore described for the polymerization of ethylene, the reactor pressure can be maintained at about 450 p.s.i.a. A typical and suitable 1-olefin solution polymerization process, with the exception of specific operating conditions set forth herein, is fully disclosed in U.S. Patent No. 2,825,721, of Hogan and Banks.

An effluent solution comprising about 40 weight percent polymer is withdrawn from reactor 10 via conduit means 20 and is passed to a conventional means for separating the diluent and polymer product such as a pressure reduction-flash vaporization vessel 21. Other means of separating the diluent from the polymer employing a vaporization step can also be employed. For example, a thin-film evaporator comprising means for agitating the polymer effluent solution and removing film from the walls of the evaporator can be employed.

I have discovered that upon the introduction of the liquid or vaporous monomer or monomers employed in the polymerization reaction zone into the effluent withdrawn from the reaction zone so as to saturate or supersaturate the effluent solution with the said monomer or monomers that substantial improvement in the separation of diluent from product polymer is effected wherein the separation step comprises the vaporization of the diluent. Wherein a single monomer is employed in the polymerization reaction zone, the monomer introduced into the polymerization reaction zone effluent is the single monomer employed in the polymerization reaction zone. Wherein two or more monomers are polymerized in the polymerization reaction zone, the monomers are introduced into the polymerization reaction zone effluent in the same relative proportion as they are introduced into the polymerization reaction zone. Although it is preferred that the introduction of the monomer or monomers in the polymerization reaction zone effluent comprise saturation or supersaturation of the polymerization reaction zone effluent with said monomer or monomers, it is within the scope of this invention to maintain a mixture of the added olefin or olefins and polymerization reaction zone effluent wherein the concentration of the monomer or monomers in the mixture is below saturation.

By introducing the monomer or monomers into the polymerization reaction zone effluent in the described manner, partial polymerization of the introduced monomer or monomers increases the concentration of polymer product in the effluent prior to the polymer-diluent separation step. It can readily be seen that by increasing the polymer product concentration in the feed to the separation zone 21 that improved pressure reduction-flash vaporization produced by valve means 22 and separation vessel 21 is produced.

Wherein the polymerization reaction is an exothermic reaction, an additional advantage of the invention is that the generated heat of reaction resulting upon the introduction of the monomer or monomers into the polymerization reaction zone effluent will permit better diluent or solvent removal in the flash separation step illustrated in the drawing or in other vaporization polymer-diluent separation steps.

With the monomer or monomers introduced into the polymerization reaction zone effluent via conduit means 26, compressor means 27, and conduit means 28, the pressure drop across valve means 22 will be substantially increased, thereby substantially increasing the efficiency of flash vaporization step illustrated in the drawing.

In addition thereto, the introduction of the monomer or monomers into the polymerization reaction zone effluent in the described manner decreases the viscosity of the effluent solution and permits handling of higher solids concentration passed in the feed to the polymer-diluent separation step.

Diluent is withdrawn from separation vessel 21 via conduit means 23. Polymer product is withdrawn from separation vessel 21 via conduit means 24 and passed to subsequent processing steps. With the olefin feed to reactor 10 comprising ethylene at the rate of 73,212 pounds per day as previously described, and a cyclohexane feed of 108,000 pounds per day, the polymer content, comprising 40 weight percent, in the effluent stream withdrawn from reactor 10 via conduit means 20 is 72,000 pounds per day, and the temperature of the effluent stream is 300° F. Upon the introduction of 3,636 pounds per day of ethylene via conduit means 28 into the effluent stream, an additional 3,000 pounds per day of polymer is formed and the concentration of polymer product is increased to 41 weight percent. The temperature of the effluent mixture passed to valve means 22 is increased to 336° F.

75,000 pounds of polymer product is withdrawn from separation vessel 21 via conduit means 24 with the pressure in separation vessel 21 maintained at a pressure of 15 p.s.i.a. and a temperature of 200° F. Prior to the introduction of ethylene into the effluent solution via conduit means 28, the 72,000 pounds of polymer product withdrawn from separation vessel 21 via conduit means 24 contains about 14.4 pounds of catalyst and about 50,000 pounds of cyclohexane or 41 weight percent cyclohexane. When operating according to the process of this invention, the 75,000 pounds of polymer product withdrawn from separation vessel 21 via conduit means 24 contains about 14.4 pounds of catalyst and about 1850 pounds of cyclohexane or 1.98 weight percent cyclohexane.

By increasing the temperature of the polymerization zone effluent from 300° F. to 336° F., the concentration of diluent in the polymer product was drastically reduced (from 41 to 1.98 weight percent). Conventional attempts to indirectly heat the polymerization effluent, such as the utilization of U-tube heat exchangers, would be unsatisfactory due to poor heat transfer characteristics of the viscous polymerization zone effluent.

As will be evident to those skilled in the art, various modifications of this invention can be made, or followed, in the light of the foregoing disclosure, without departing from the spirit or scope thereof.

I claim:
1. In the solution polymerization of 1-olefins in a polymerization zone wherein the concentration of the product polymer in said zone is at least 20 weight percent, in the presence of a catalyst suspension in said zone comprising chromium oxide in finely divided form suspended in a diluent; and in which an effluent mixture of polymer, catalyst and diluent is withdrawn from said zone through a conduit to a separation zone having a reduced pressure, wherein at least the major portion of said diluent is flashed from said polymer and catalyst in said separation zone, and the polymer with the catalyst and the flashed diluent are separated and drawn off as separate products; the improvement comprising maintaining the olefin feed rate and catalyst feed rate so that the concentration of the catalyst in the polymer product is not more than about 0.02 weight percent; and increasing the rate of polymer produced by at least 3 weight percent and decreasing the amount of diluent in said polymer and catalyst product by at least 80 weight percent by adding sufficient additional olefin to the effluent in said conduit without adding substantial amounts of additional diluent in said conduit to raise the temperature of the effluent to said separation zone by more than 20° F. by internal heating due to further polymerization.

References Cited

UNITED STATES PATENTS

| | | | |
|---|---|---|---|
| 2,963,470 | 12/1960 | Lanning | 260—94.9 |
| 3,093,626 | 6/1963 | Cines | 260—94.9 |
| 3,195,613 | 7/1965 | Hawkins | 260—94.9 |
| 3,197,453 | 7/1965 | Harban | 260—94.9 |

JOSEPH L. SCHOFER, *Primary Examiner.*

L. EDELMAN, *Assistant Examiner.*